United States Patent
Ulloa (10) Patent No.: US 6,390,887 B1
(45) Date of Patent: May 21, 2002

(54) PRE-CUTTER AND EDGER MACHINE

(75) Inventor: Jose Ulloa, Roanoke, VA (US)

(73) Assignee: Johnson & Johnson Vision Products, Inc., Jacksonville, FL (US)

( * ) Notice: Subject to any disclaimer, the term of this patent is extended or adjusted under 35 U.S.C. 154(b) by 0 days.

(21) Appl. No.: 09/468,467

(22) Filed: Dec. 21, 1999

(51) Int. Cl.⁷ .............................................. B24B 49/00
(52) U.S. Cl. ................................ 451/8; 451/42; 451/44
(58) Field of Search ........................... 451/5, 8, 42, 43, 451/44, 54, 57, 65, 256

(56) References Cited

U.S. PATENT DOCUMENTS

| | | |
|---|---|---|
| 2,922,259 A | 1/1960 | Rada et al. |
| 5,148,637 A | 9/1992 | Byron |
| 5,210,695 A | 5/1993 | Wood |
| 5,408,792 A | 4/1995 | Gottschlad |
| 5,454,194 A | 10/1995 | Gottschlad |
| 5,588,899 A | 12/1996 | Gottschlad |
| 5,727,987 A | 3/1998 | Gottschlad |
| RE35,898 E | 9/1998 | Shibata et al. |
| 5,816,891 A | * 10/1998 | Woo .............................. 451/6 |
| 6,062,954 A | * 5/2000 | Izumi .......................... 451/72 |

FOREIGN PATENT DOCUMENTS

| | | |
|---|---|---|
| EP | 839603 A1 | 5/1998 |
| EP | 917930 A2 | 5/1999 |
| FR | 2483631 B | 12/1981 |

* cited by examiner

Primary Examiner—Timothy V. Eley
Assistant Examiner—Dung Van Nguyen
(74) Attorney, Agent, or Firm—Lois Gianneschi

(57) ABSTRACT

A pre-cutter or edger machine for processing the periphery of an optic is provided. The pre-cutter or edger machine of the present invention is advantageous in that it provides a machine that eliminates the need to mount the optic on a block, is completely automatic, and has a cycle time of approximately 10 seconds. The machine also is capable of pre-cutting or edging an optic to any of a number of different diameters or shapes with or without the need for traced data. The machine cleans the optic automatically and maintains the edge processing stations substantially free from debris.

10 Claims, 9 Drawing Sheets

PRE-CUTTER AND EDGER MACHINE

FIELD OF THE INVENTION

The present invention relates to machines useful in the production of spectacle lenses. In particular, the invention provides a machine for pre-cutting or edging an optic lens.

BACKGROUND OF THE INVENTION

After manufacture of a spectacle lens, it is necessary to edge the lens so that the lens will fit into a spectacle frame. Additionally, in some manufacturing processes that use optical preforms or wafers, it may be desirable to pre-cut a preform or wafer prior to casting one or more layers onto its surfaces in order to minimize center thickness.

The majority of current pre-cutter and edger machines require the optic, meaning a lens, preform, or wafer to be mounted on a block for holding and positioning the optic. The use of a block is disadvantageous in that it must be removed after the trimming or edging process is complete. In addition, the optic is secured to the block by an adhesive that must be cleaned off of the optic once the operation is complete. These additional steps are relatively complex and thus, relatively expensive to automate.

Conventional pre-cutter and edger machines also are disadvantageous in several other respects. In particular, current machines require an operator to load and download the optic at each station, which is inefficient and expensive. Another problem is that traced data is required to cut the optic to fit a particular frame shape. Furthermore, the optic is cleaned manually. For these reasons, conventional pre-cutting and edging machines are inefficient and expensive.

In addition, it is important to maintain the area in which the optic is being manufactured substantially free from particles and debris. To ensure that the edging or pre-cutting debris does not contaminate the manufacturing area, these operations are typically performed in an area separate from the optic manufacturing area.

Finally, typically conventional machines have an optimum cycle time of approximately 60 seconds per optic. Thus, more than one machine is generally used in order to increase the production rate.

It is therefore desirable to develop a pre-cutter, an edger, or both that overcomes some or all of these disadvantages.

DETAILED DESCRIPTION OF THE INVENTION AND PREFERRED EMBODIMENTS

The present invention is directed to a machine for processing an optic. By "optic" is meant a spectacle lens, a preform, or an optical wafer. By "preform" or "optical wafer" is meant a shaped, optically transparent article capable of refracting light and suitable for use in producing a spectacle lens.

In the machine of the invention, a controller for generating control signals and a platform, secured proximate an outer perimeter of a turntable or line, for supporting the optic is provided. The turntable is rotatable so that the platform is transferred between a plurality of processing stations in response to the control signals generated by the controller. Alternatively, the platform may transfer between a plurality of processing stations along a line, also in response to the controller's signals. The plural processing stations about the turntable or along the line include: 1.) an infeed station for receiving the optic to be processed; 2.) a scanning station for determining a height of the optic and detecting an orientation mark on a surface of the optic, or within the optic, and proximate the edge of the optic; 3.) a grinding station for grinding the periphery of the optic relative to the geometrical center based on a selected shape recipe from a plurality of prescribed shape recipes stored in a memory device or trace data; 4.) a verification and, optionally, notching station for confirming that the diameter of the optic conforms with that of the prescribed shape recipe and, optionally, transposing the orientation mark on the edge of the ground optic; 5.) a cleaning and drying station; and 6.) an outfeed station for receiving the processed optic. By "shape recipe" is meant the parameters necessary for grinding the optic to a desired shape or configuration including, without limitation, a substantially round, elliptical, or ovoid configuration, or a configuration that substantially corresponds to spectacle frame trace data, or the like, and combinations thereof.

The invention is also related to a method for processing an optic using a machine as described above. The method for automatically processing an optic includes the steps of automatically downloading the optic off of an infeed platform at an infeed station using a transfer means and loading it on to a turntable platform secured proximate an outer perimeter of a turntable or a line. The optic is automatically centered by the transfer means so as to be substantially concentric with the platform. Next, the turntable is rotated or platform moved so that the optic is positioned at a scanning station. At the scanning station, a front surface of the optic is scanned using a first probe to determine an absolute height of the optic, while a back surface of the optic is scanned using a second probe to locate an orientation mark. The mark may be on a surface of the optic or within the optic. The turntable is then rotated or platform moved to position the optic at a coarse grinding station for grinding the periphery of the optic based on a selected shape recipe from a plurality of prescribed shape recipes stored in a memory device. Thereafter, the turntable is once again rotated or platform moved to position the optic at a finer grinding station, wherein a final portion of the periphery of the optic is ground based on the selected shape recipe using a first grinding wheel, followed by a fine grinding station, wherein final grinding of the periphery of said optic based on the selected shape recipe using a second grinding wheel is performed. The second grinding wheel is smoother than the first grinding wheel.

One ordinarily skilled in the art will recognize that the edge of an optic may be edged or pre-cut by any of a wide variety of edge processing means, which means include, without limitation, grinding, cutting, shaving, and the like, and combinations thereof. Thus, the machine of the invention is meant to encompass all such edge processing means, although for purposes of convenience, the invention is exemplified herein using grinding as the processing means.

To maintain the grinding station substantially debris free, a cleaning means is used such as a fluid (e.g. water), air or a combination thereof and which may be sprayed through an array of nozzles oriented facing an inner wall of a debris containment enclosure in which the grinding wheel is housed. Once the optic has been ground, the turntable is rotated or platform moved to position the optic at a verification and, optionally, notching station, wherein the diameter of the optic is checked to ensure that it conforms with the selected shape recipe and, optionally, a notch may be defined in the surface in a position corresponding to the orientation mark. Then the optic is downloaded, moved to a cleaning and drying station, wherein the optic is loaded on to a cleaning platform housed within a cleaning containment enclosure. While isolated in the cleaning containment enclosure the optic is subjected to a cleaning means, such as air, a cleaning fluid, or a combination thereof and the cleaning platform may be rotated about a center axis of the cleaning containment enclosure to dry the optic. As a final step, the optic is downloaded from the cleaning platform and moved to an outfeed station.

Figure 1:
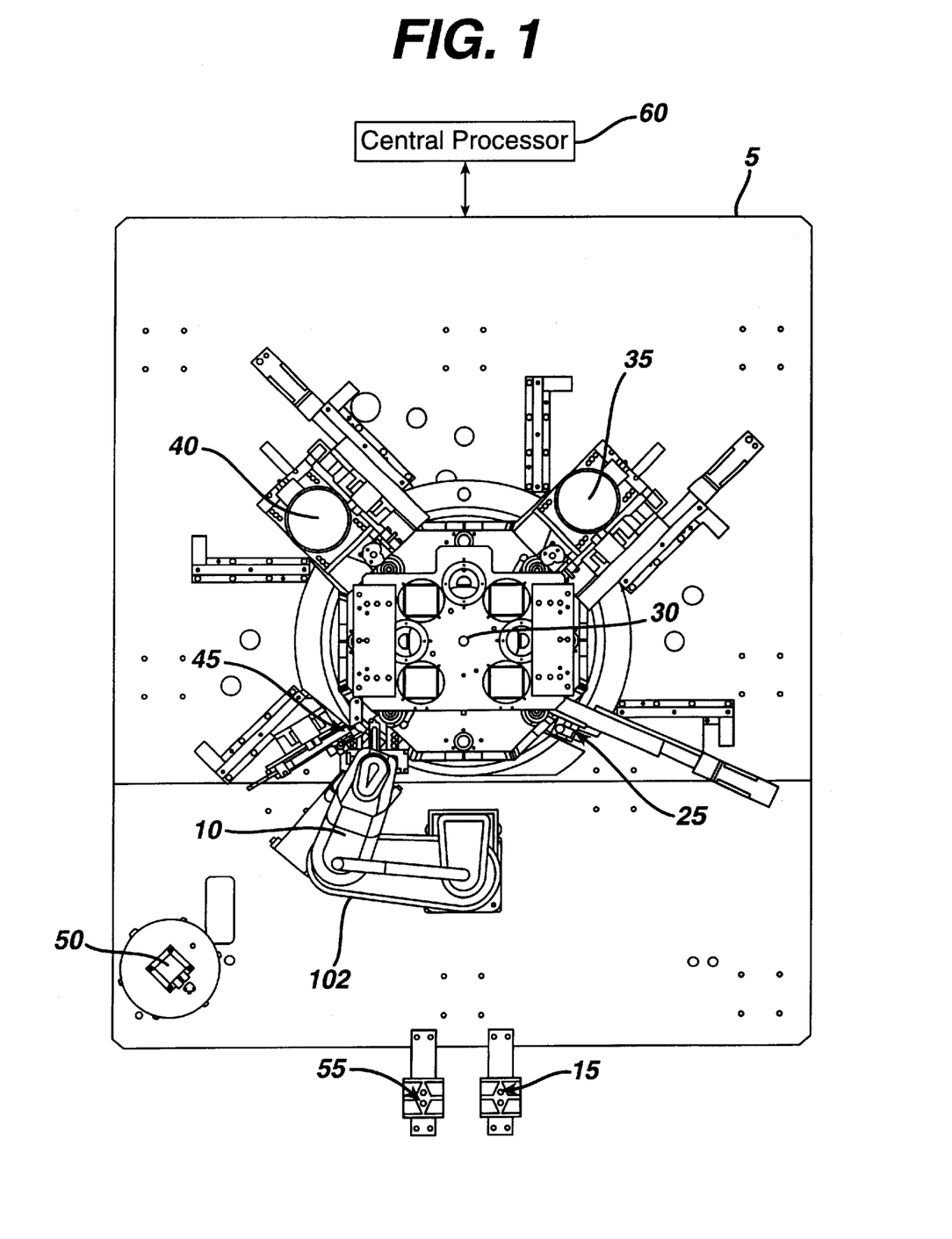
FIG. 1 is a top view of an exemplary pre-cutter machine in accordance with the present invention.
Figure 2:
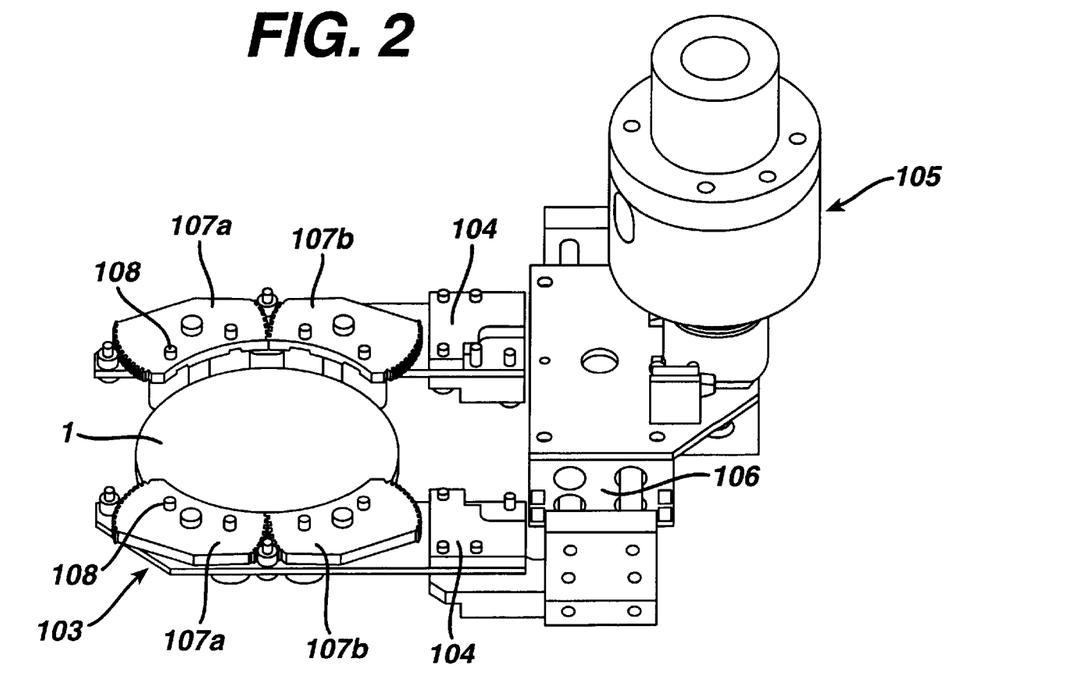
FIG. 2 is a perspective view of an exemplary single-sided transfer means of the machine in FIG. 1 while holding an optic.

FIG. 1 is a top view of a preferred pre-cutter/edger machine 5 in accordance with the present invention which: 1.) locates the geometrical center of an optic 1 by mechanical means; 2.) detects the height of the optic and an orientation mark proximate the edge of the optic; 3.) cuts the optic concentric or eccentric in relation to the geometrical center to a prescribed diameter; 4.) transposes the orientation mark on the edge of the optic to the new edge; 5.) cleans and, if necessary, dries the optic; and 6.) verifies the diameter of the optic. Pre-cutter/edger machine 5 includes a transfer means 10, such as a mechanical arm or robot having a pivot arm 102 and a gripper 103 including two fingers 104, as shown in FIG. 2. To increase efficiency, the gripper may be multi-sided, preferably two-sided, so that it is capable of grasping two or more optics.

In FIG. 2, transfer means 10 is connected to the pivot arm 102 by a mount 105. An opening means, such as air cylinder 106 is used to open and close the gripper by displacing the fingers 104 in a horizontal plane with respect to one another about the periphery of the optic 1. Each finger 104 terminates in a pair of gears 107a, 107b.

Figure 3:
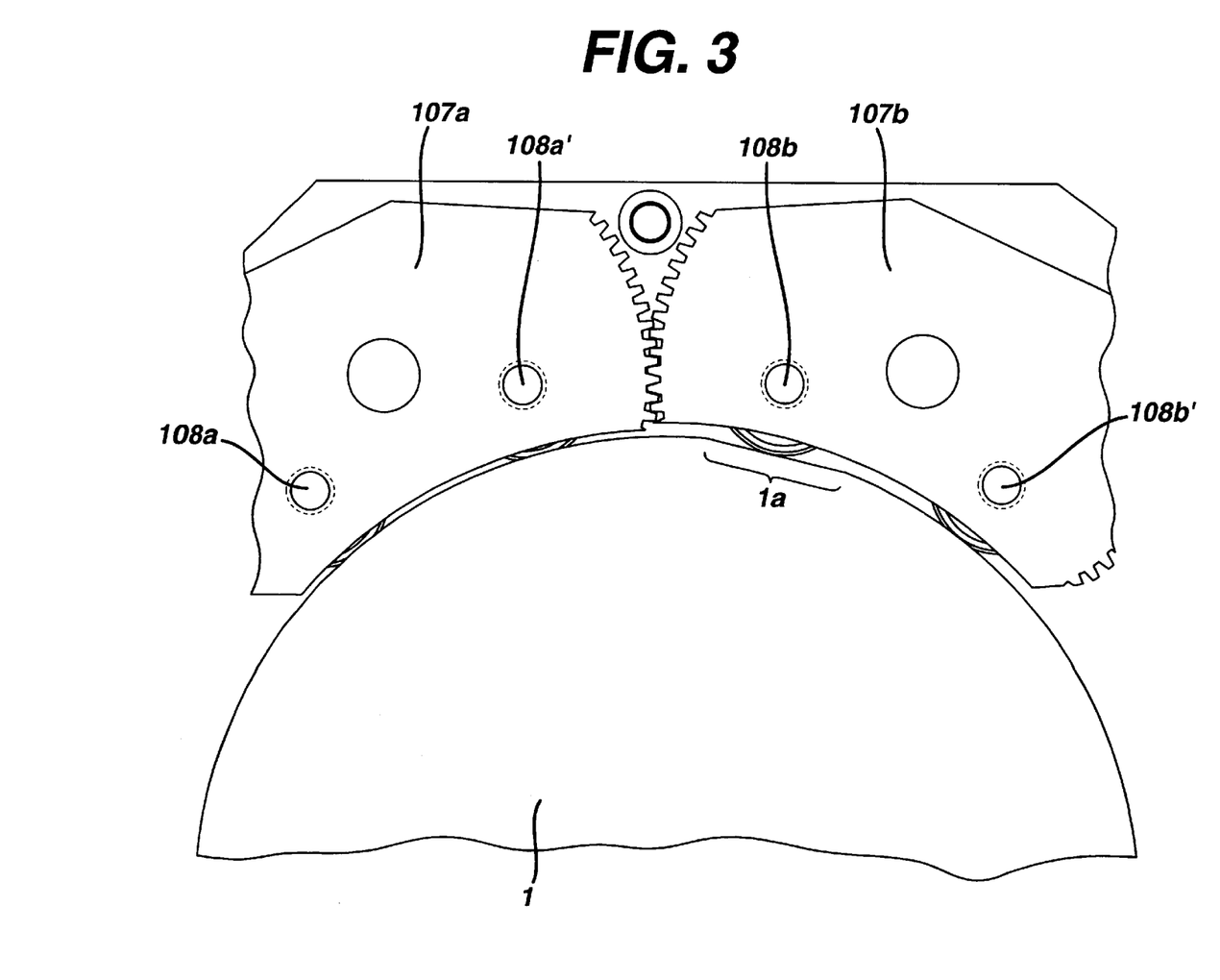
FIG. 3 is an enlarged partial top view of one pair of gears of the transfer means in FIG. 2 disposed about the periphery of an optic.

FIG. 3 is an enlarged view of one pair of the gears 107a, 107b disposed about the periphery of the optic 1. As is shown in FIG. 3, during manufacturing of the optic 1 and to degate the injection molding, flats 1a may be cut into the periphery of the optic, as is well known in the field. Because of the flats 1a, use of a conventional gripping device would result in an inaccurate determination of the center of the optic using the gripper. The gears 107a, 107b in accordance with the present invention are designed to accurately detect the center of the optic irrespective of the flats 1a. In particular, spring loaded pins 108a, 108a', 108b', 108b' extend radially inward relative to the periphery of the gears 107a, 107b.

By way of example, FIG. 3 shows pin 108b contacting a flat 1a. Gear 107a contacting a portion of the circumference of the optic 1 without any flats has a greater diameter than that of the gear 107b contacting a portion of the circumference of the optic 1 with a flat 1a. The gears work dependently of each other. Therefore, gear 107a after contacting the outer circumference of the optic 1 without flats 1a, will prevent the other gear 107b from being drawn closer towards the flat 1a. Accordingly, the gears prevent the gripper from closing in too tightly around a flat portion of the optic, thereby ensuring an accurate determination of the center of the optic.

As shown, machine 5 has an infeed station 15, a scanning station 25, a coarse grinding station 35, a fine grinding station 40, a verification and, optionally, notching station 45, a cleaning and drying station 50, and an outfeed station 55. In operation, initially an optic is manually placed on a platform at the infeed station 15. Alternatively, the optic may be automatically placed on the platform using a separate robot or transfer means. Sensors in the platform generate a signal that is transmitted to a remote central processor 60 indicating that the optic has been placed at the infeed station 15. In an alternative embodiment, the central processor may be disposed locally in the machine itself. Upon receipt of a selected effective recipe from the central processor 60 and an indication from the sensors that the optic has been loaded on to the infeed station, a signal is generated indicating that the optic is ready to be processed.

Figure 6:
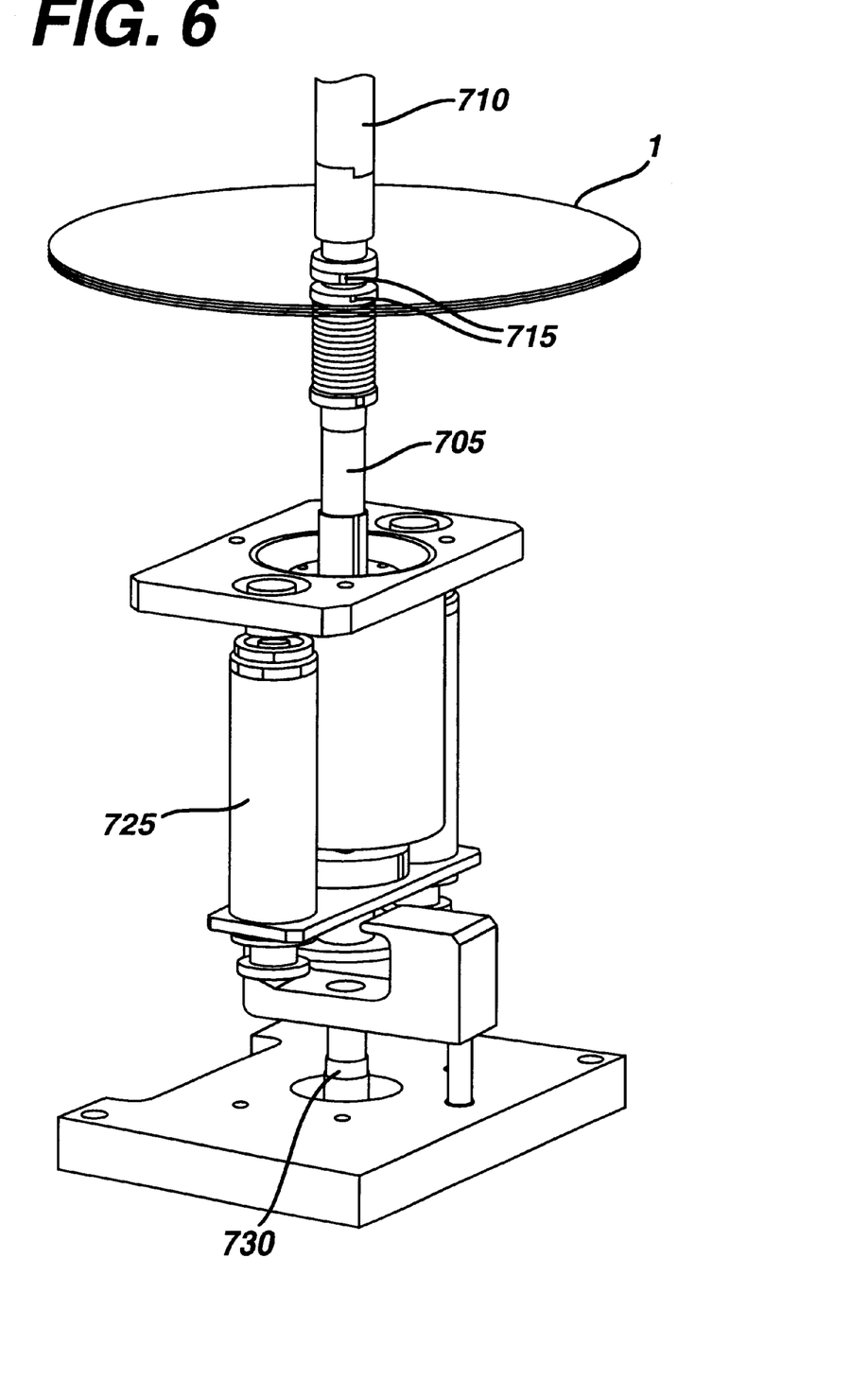
FIG. 6 is an enlarged perspective view of the platform for supporting the optic on the turntable.

Transfer means 10 picks the optic from the platform of the infeed station 15 and loads the optic substantially concentric on a platform secured proximate the outer perimeter of a turntable 30. FIG. 6 shows the platform with a lens 1 held between pads 715 by a pair of vertically displaced support members 705, 710. Upper support member 710 is stationary, while lower support member 705 is displaceable in a vertical direction by an air cylinder 730. A spring 725 maintains the lower support member 705 in a closed position with the associated pad concentric with the lens. To load the lens 1, the support member 705 is lowered out of the way, and the lens, while being held by the gripper, is positioned in contact with the pad 715 associated with the upper support member 710. Then the lower support member 705 and its associated pad 715 are raised in contact with the lens. As the gripper picks up the lens it locates the center of the lens.

Figure 8:
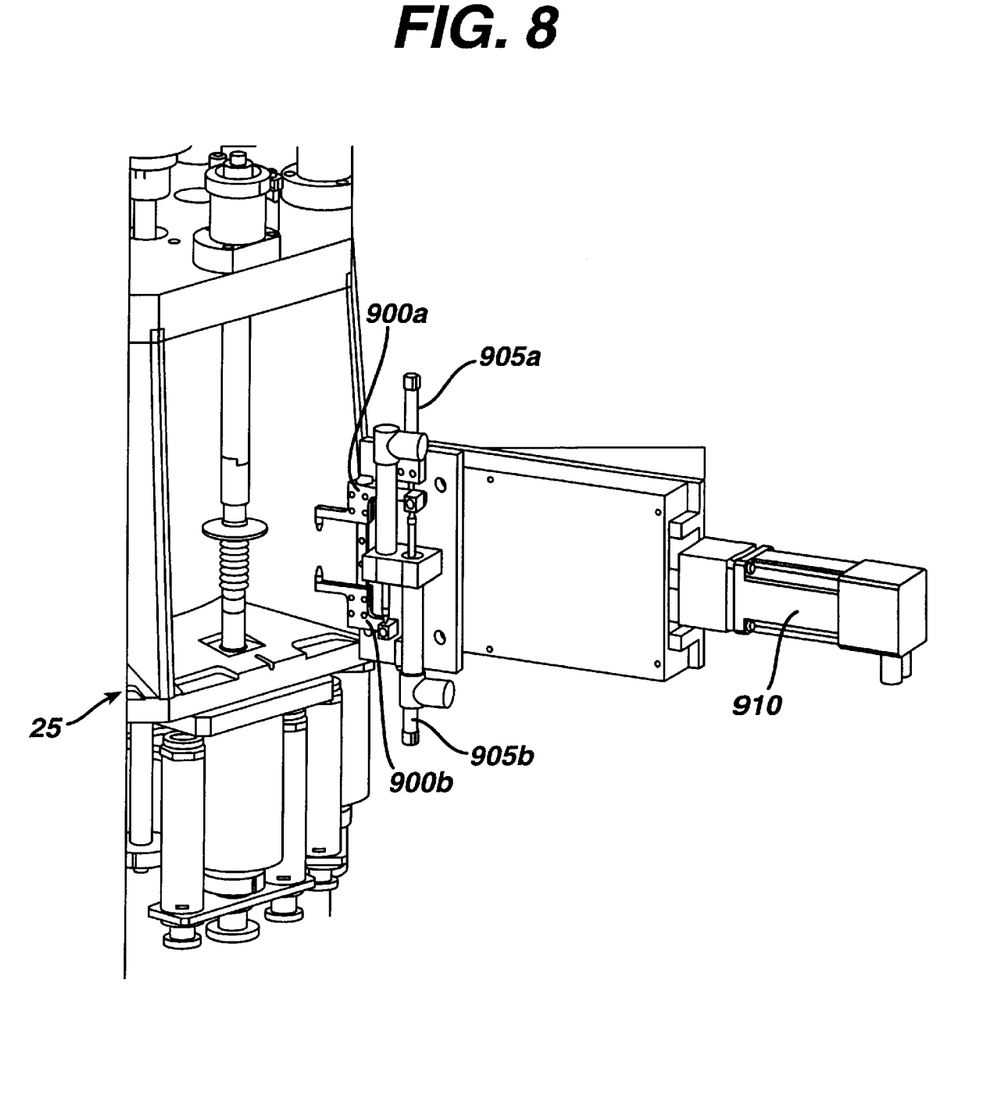
FIG. 8 is an exemplary perspective view of the scanning station in FIG. 1.

Turntable 30 is rotated until the optic 1 is positioned at the scanning station 25, as shown in FIG. 8. At the scanning station 25, a first probe 900a scans the front surface of the optic to determine its absolute height, while a second probe 900b scans the optic to locate an orientation mark disposed on the back surface of, or a mark within, the optic proximate its periphery or edge. If a surface mark is used, preferably the mark is a protrusion, more preferably on the back surface of the optic, the protrusion projecting approximately 50 micrometers (0.05 mm) in height relative to the back surface of the optic. Probes 900a, 900b are moved in a vertical direction via any movement means, such as hydraulic or, preferably, air cylinders 905a, 905b, respectively, and arranged in a radial direction by way of a servo motor 910.

Figure 4:
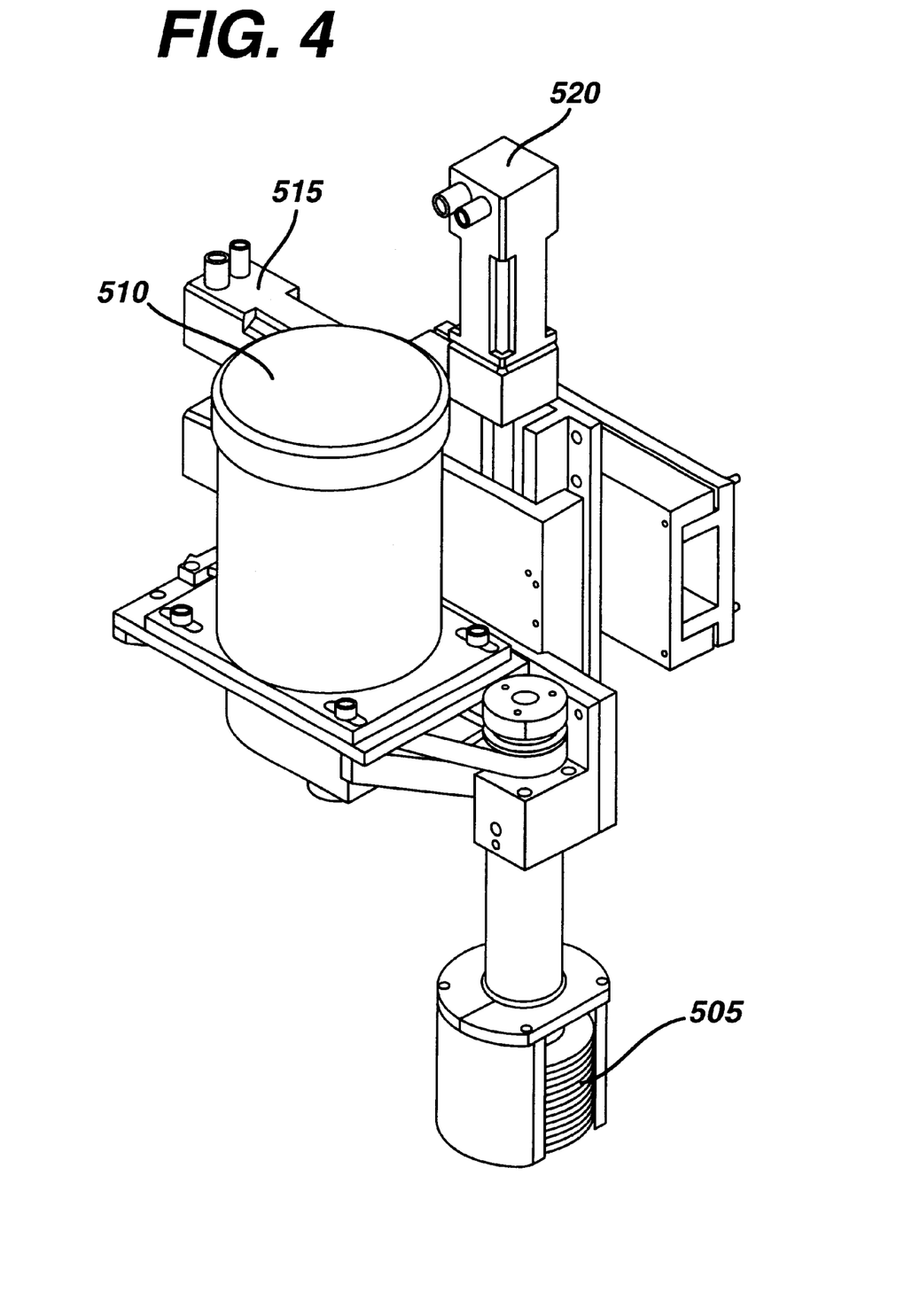
FIG. 4 is a perspective view of an exemplary coarse grinding station of the machine in FIG. 1.

Next, the turntable 30 rotates the optic from the scanning station 25 to the coarse grinding station 35. FIG. 4 is a perspective view of the grinding station 35 including a grinding wheel 505 used to trim the periphery of the optic to a specified diameter in accordance with a selected shape recipe from a plurality of prescribed shape recipes stored in a memory device of the central processor 60. Alternatively, the prescribed recipes or trace data may be stored in a local memory device in the machine itself or may be entered, for example, using a keyboard or a mouse. Grinding wheel 505 is moved proximate the lens using horizontal and vertical motors 515, 520, respectively, and once properly positioned, the wheel is driven by a motor 510. After the desired portion of the periphery of the optic has been ground, the turntable 30 rotates the optic to a fine grinding station 40, wherein final grinding of the periphery of the optic is performed using a finer grinding wheel than that used for the rough grinding. The structure of the fine grinding station is similar to that shown in FIG. 4 for the coarse grinding station, except for the use of different grinding wheels 505.

Figure 5:
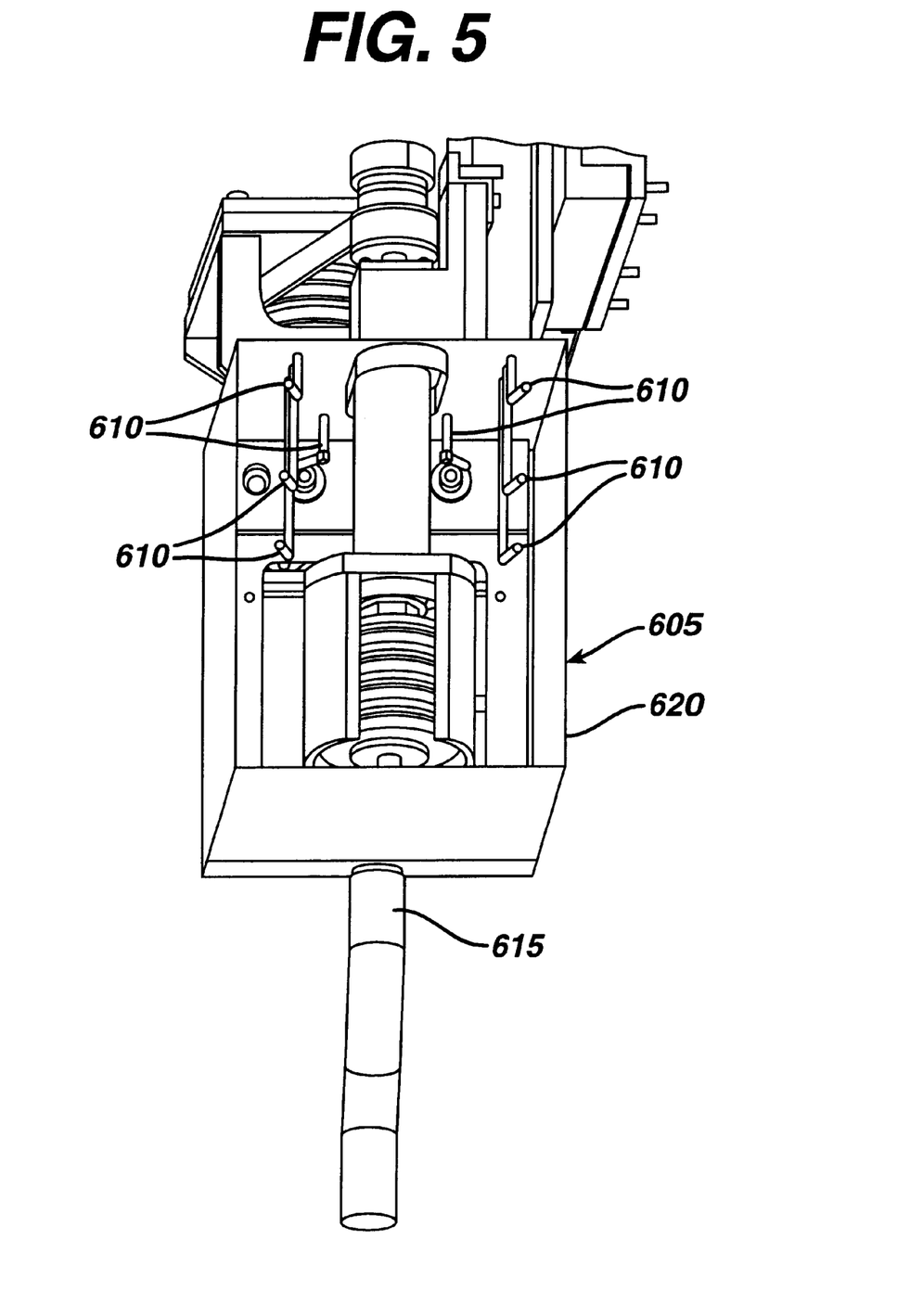
FIG. 5 is a partial cut-away perspective view of the debris containment enclosure with a grinding wheel disposed therein.

The particles and debris, for example, of polycarbonate material, produced as a result of grinding of the periphery of the optic, reduce overall efficiency of the machine and may ultimately result in mechanical failure. It is therefore desirable to maintain a clean working area by cleaning the debris, preferably by wetting the debris without wetting the optic and grinding wheel. This is accomplished by isolating the grinding wheel 505, platform 705, 710 and optic 1 in a debris containment enclosure 605, as shown in the partial cut-away perspective view in FIG. 5. The lip 620 of the debris containment enclosure 605 mates with the turntable 30 to enclose the optic and the grinding wheels. While grinding the excess polycarbonate from the periphery of the optic, an array of nozzles 610 disposed along the periphery of the enclosure sprays air, a fluid, for example deionized water, or a combination thereof against the inner wall of the enclosure. The ground particles or debris are flushed out of the debris containment enclosure 605 via a channel 615. Coarse and fine grinding stations 35, 40 may be confined in a single or separate debris containment enclosures to maintain a substantially debris free manufacturing area.

Figure 9:
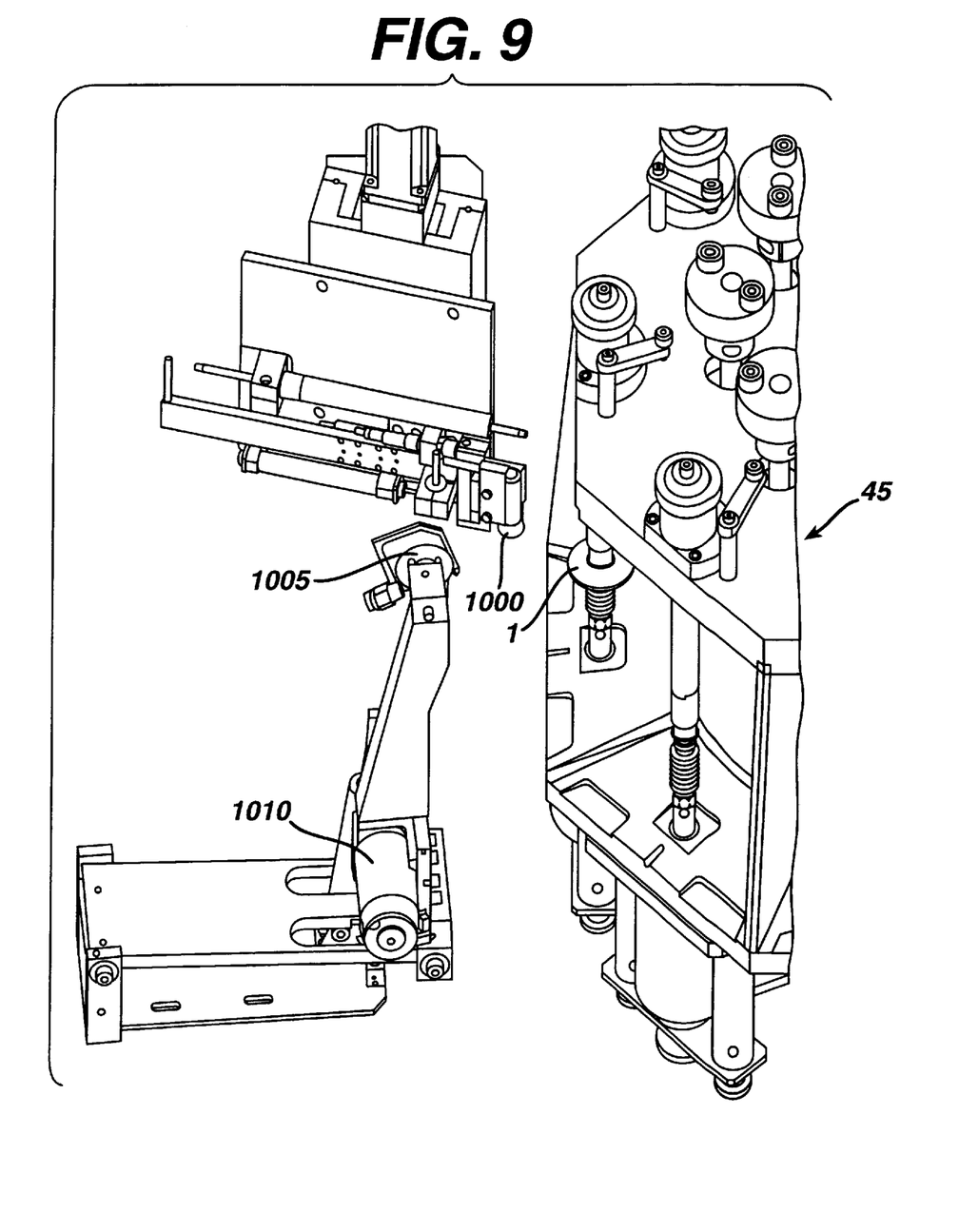
FIG. 9 is an exemplary perspective view of the verifying and notching station in FIG. 1.

Thereafter, the turntable 30 is rotated to the verification and, in the pre-cutter embodiment, notching station 45, as shown in FIG. 9. At this position, the machine verifies the diameter of the optic 1, for example, using a mechanical roller 1000. Additionally, in the pre-cutter embodiment, a notch is cut into the periphery of the optic, at the exact location in which the scanning station detected the orientation mark, using a notching wheel 1005. It is necessary to reestablish the orientation mark since the original mark located proximate the perimeter of the optic has been ground away in the grinding operation. Roller 1000 is displaceable along a vertical axis as well as radially, while notching wheel 1005 is driven by a motor 1010 and displaceable in a horizontal plane.

Figure 7:
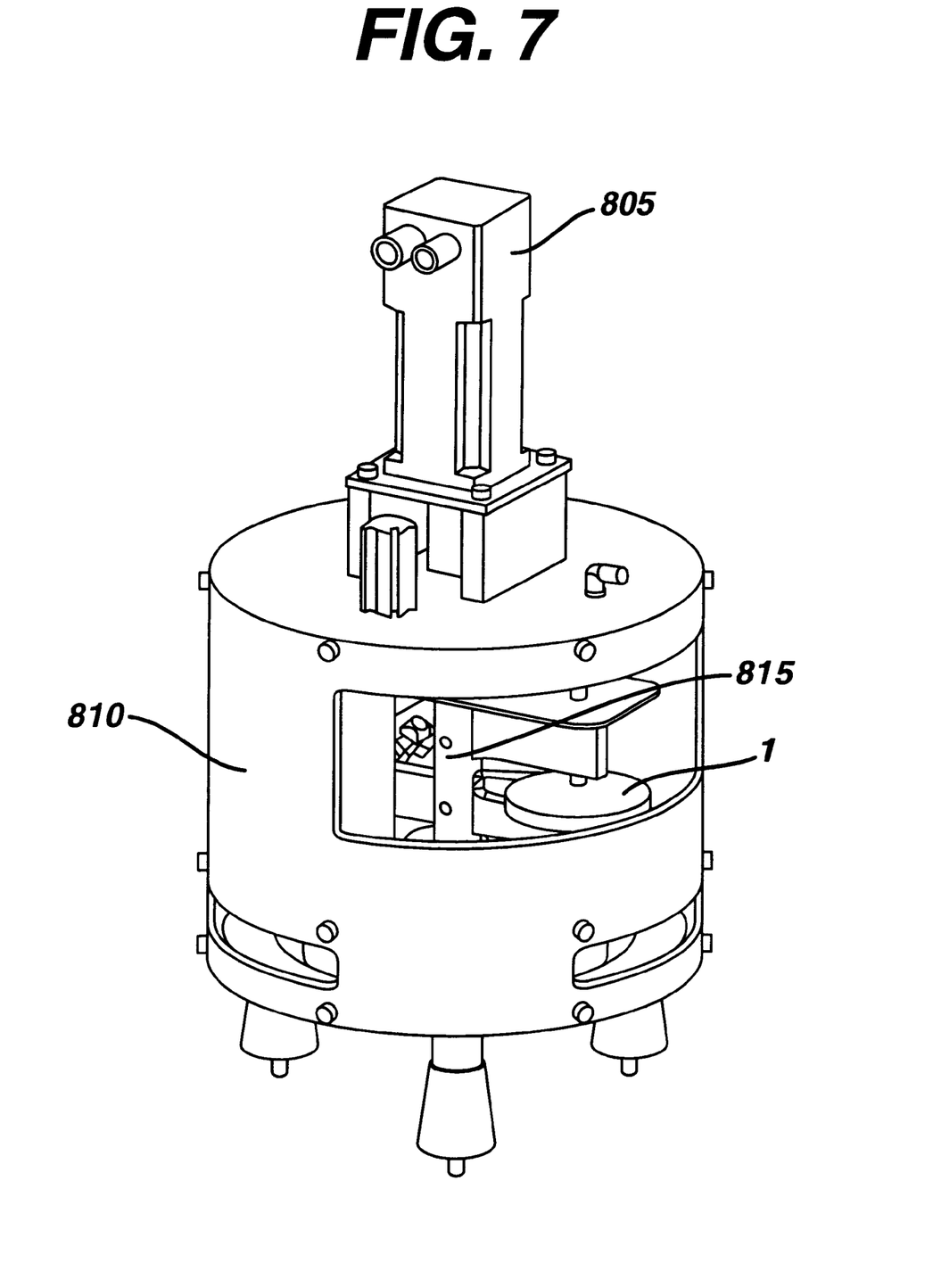
FIG. 7 is an exemplary perspective view of the cleaning and drying station in FIG. 1.

The transfer means 10 then downloads the optic from the platform 705, 710 of the turntable 30 and moves it to the cleaning and, if necessary, drying station 50, as shown in FIG. 7. To remove the optic from the vertical support members 705, 710 of station 50, the fingers of the gripper are placed around the lens and then the lower support member 705 is lowered so that the optic is only supported by the gripper 103. At station 50, the lens 1 to be cleaned is held between a pair of vertically displaced support members similar to that shown in FIG. 6, but smaller in size.

In the embodiment in which a multi-sided gripper, such as a duo-sided gripper is employed, if a first optic that has been cleaned and dried is loaded onto the support members of station 50 then the duo-sided gripper, while grasping a second optic to be cleaned and dried, downloads the first optic from the cleaning and drying station 50 and loads the second optic to be cleaned on to the support members.

Once the optic has been positioned between the vertical support members at station 50, both surfaces of the optic are sprayed with air, a cleaning solution, such as deionized water, or both. Preferably, the vertical support members are mounted eccentrically on a shaft connected to a servomotor 805 such that when the servomotor rotates about a center axis 815, the optic spins and the centrifugal force generated by the rotation causes the debris and water to slide off of the surfaces of the optic, hit the side of the cleaning containment enclosure 810, and run off into a channel.

The transfer means 10 moves the optic from station 50 to a platform at the outfeed station 55. Specifically, the fingers of the gripper are placed around the periphery of the optic while held between the support members 705, 710. Support member 705 is then lowered in a vertical direction, thereby releasing the lens from between the support members so that the optic remains supported by the gripper. After the optic has been placed on the platform at the outfeed station 20 and the transfer means 10 has been moved out of the way, the machine transmits information to the central processor 60 signaling that processing of the optic is completed. When the optic is picked up from the platform at the outfeed station 20, the signal is reset.

The pre-cutter or edger machine of the present invention is advantageous in that it provides a machine that eliminates the need to mount the optic on a block. Additionally, the machine is completely automatic and has a cycle time of approximately 10 seconds. The machine also is capable of pre-cutting or edging an optic to any of a number of different diameters with or without the need for traced data. The machine cleans the optic automatically and maintains the grinding stations substantially free from debris.

Although there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and, steps or both that perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A method for automatically processing an optic, comprising the steps of:
   (a) automatically downloading said optic off of an infeed platform at an infeed station using a transfer means;
   (b) loading said optic on to a turntable platform secured proximate an outer perimeter of a turntable; and
   (c) automatically centering said optic so as to be substantially concentric with said turntable platform using said transfer means;
   (d) rotating said turntable so that said optic is positioned at a scanning station;
   (e) scanning a front surface of said optic using a first probe to determine the height of said optic; and
   (f) scanning a back surface of said optic using a second probe to locate an orientation mark.

2. The method in accordance with claim 1, further comprising the steps of:
   (g) rotating said turntable to position said optic at a grinding station for grinding the periphery of said optic based on a selected shape recipe from a plurality of prescribed shape recipes stored in a memory device.

3. The method in accordance with claim 2, wherein said rotating step (g) comprises:

(h) rotating said turntable to position said optic at a coarse grinding station;

(i) grinding a significant portion of the periphery of said optic based on the selected shape recipe using a first grinding wheel;

(j) rotating said turntable to position said optic at a fine grinding station; and (k) grinding a significant portion of the periphery of said optic based on the selected recipe using a second grinding wheel, said second grinding wheel being smoother than said first grinding wheel.

4. The method in accordance with claim 2, further comprising spraying a fluid through an array of nozzles oriented facing an inner wall of a debris containment enclosure in which said grinding wheel is housed.

5. The method in accordance with claim 2, further comprising:

(l) rotating said turntable to position said optic at a verification station; and (m) verifying that a diameter of said optic conforms with the selected recipe.

6. The method of claim 5, wherein the verification station of step (m) further comprises a notching station for defining a notch in the surface of the optic in a position corresponding to the orientation mark.

7. The method in accordance with claim 5 or 6, further comprising:

(n) downloading said optic from said turntable;

(o) moving said optic from said turntable to a cleaning and drying station;

(p) loading said optic on to a cleaning platform housed within a cleaning containment enclosure;

(q) spraying said optic with a cleaning fluid; and (r) rotating said cleaning platform about a center axis of the cleaning containment enclosure to dry said optic.

8. The method in accordance with claim 7, further comprising:

(s) downloading said optic from said cleaning platform; and (t) moving said optic from the cleaning and drying station to an outfeed station.

9. The method in accordance with claim 1, wherein said turntable platform includes an upper support member and a lower support member.

10. The method in accordance with claim 9, wherein said loading step (b) comprises:

lowering said lower support member in a vertical direction;

moving said transfer means so that said optic is positioned in contact with said upper support member; and raising said lower support member to contact said optic so that said optic is held between said upper and lower support members.

\* \* \* \* \*